(12) United States Patent
Chatterjee et al.

(10) Patent No.: US 11,593,494 B2
(45) Date of Patent: Feb. 28, 2023

(54) SYSTEM FOR MONITORING NETWORKED COMPUTING DEVICES WITH INTEGRATED ELECTRONIC DATA ENCRYPTION AND DECRYPTION MECHANISM

(71) Applicant: Bank of America Corporation, Charlotte, NC (US)

(72) Inventors: Mousumi Chatterjee, Frisco, TX (US); Shyam Acharya, Monroe, NJ (US); James Alexander, Dripping Springs, TX (US); David Smiddy, Chadds Ford, PA (US); Devi Kumar, West Windsor, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 387 days.

(21) Appl. No.: 16/891,933

(22) Filed: Jun. 3, 2020

(65) Prior Publication Data
US 2021/0382998 A1    Dec. 9, 2021

(51) Int. Cl.
| | | |
|---|---|---|
| *G06F 21/60* | (2013.01) | |
| *G06F 9/54* | (2006.01) | |
| *H04L 67/02* | (2022.01) | |
| *G06F 16/22* | (2019.01) | |
| *G06F 11/30* | (2006.01) | |

(52) U.S. Cl.
CPC ............ *G06F 21/602* (2013.01); *G06F 9/547* (2013.01); *G06F 11/3006* (2013.01); *G06F 16/2282* (2019.01); *H04L 67/02* (2013.01)

(58) Field of Classification Search
CPC .... G06F 21/602; G06F 9/547; G06F 11/3006; G06F 16/2282; H04L 67/02; H04L 63/0435
See application file for complete search history.

(56) References Cited

U.S. PATENT DOCUMENTS

| | | |
|---|---|---|
| 7,080,410 B2 | 7/2006 | England et al. |
| 7,272,858 B2 | 9/2007 | Parks et al. |
| 7,380,120 B1 | 5/2008 | Garcia |
| 7,464,171 B2 | 12/2008 | Rambhia |
| 7,681,034 B1 | 3/2010 | Lee et al. |
| 7,702,925 B2 | 4/2010 | Northcutt et al. |
| 7,757,077 B2 | 7/2010 | Peinado et al. |
| 7,921,288 B1 | 4/2011 | Hildebrand |
| 7,921,450 B1 | 4/2011 | Vainstein et al. |
| 7,970,142 B2 | 6/2011 | Vennelakanti et al. |
| 7,970,143 B2 | 6/2011 | Vennelakanti et al. |
| 8,510,849 B2 | 8/2013 | MacKay et al. |

(Continued)

*Primary Examiner* — Michael A Keller
(74) *Attorney, Agent, or Firm* — Moore & Van Allen PLLC; Seongun M. Hong

(57) ABSTRACT

A system for monitoring networked computing devices with integrated electronic data encryption and decryption mechanism is provided. In particular, the system may comprise one or more host applications which may interact with an API layer to transmit encrypted host-related data through a secure data rails to a consolidated data repository. One or more downstream monitoring applications may retrieve and decrypt the host-related data from the consolidated data repository for analysis. In this way, the system may provide a secure, scalable way to monitor host computing systems and flow of sensitive electronic data.

14 Claims, 2 Drawing Sheets

(56) References Cited

U.S. PATENT DOCUMENTS

| | | | |
|---|---|---|---|
| 8,600,895 B2 | 12/2013 | Felsher | |
| 9,111,123 B2 | 8/2015 | Mansi et al. | |
| 9,425,958 B2 | 8/2016 | Vennelakanti et al. | |
| 10,037,436 B2 | 7/2018 | White | |
| 10,628,597 B2 | 4/2020 | Berger et al. | |
| 10,778,658 B1 * | 9/2020 | Reddy | H04L 9/14 |
| 2002/0048369 A1 | 4/2002 | Ginter et al. | |
| 2007/0283170 A1 | 12/2007 | Yami et al. | |
| 2008/0034205 A1 | 2/2008 | Alain et al. | |
| 2011/0173695 A1 | 7/2011 | Ginter et al. | |
| 2011/0307937 A1 | 12/2011 | Hildebrand et al. | |
| 2013/0086376 A1 | 4/2013 | Haynes | |
| 2018/0152977 A1 * | 5/2018 | Baron | H04W 8/005 |
| 2022/0209944 A1 * | 6/2022 | Nix | H04L 9/3093 |

* cited by examiner

200

```
┌─────────────────────────────────────────────────────┐
│ RECEIVE, FROM A HOST COMPUTING SYSTEM VIA AN APPLICATION │
│ PROGRAMMING INTERFACE ("API") LAYER, A SET OF HOST DATA │
│                    AND METADATA                     │
│                         201                         │
└─────────────────────────────────────────────────────┘
                          │
                          ▼
┌─────────────────────────────────────────────────────┐
│  ENCRYPT, USING AN ENCRYPTION MODULE, THE HOST DATA AND │
│                      METADATA                       │
│                         202                         │
└─────────────────────────────────────────────────────┘
                          │
                          ▼
┌─────────────────────────────────────────────────────┐
│  TRANSMIT THE HOST DATA AND METADATA TO A CONSOLIDATED │
│                      DATA SINK                      │
│                         203                         │
└─────────────────────────────────────────────────────┘
                          │
                          ▼
┌─────────────────────────────────────────────────────┐
│ RECEIVE A REQUEST FROM A MONITORING COMPUTING SYSTEM │
│        TO DECRYPT THE HOST DATA AND METADATA        │
│                         204                         │
└─────────────────────────────────────────────────────┘
                          │
                          ▼
┌─────────────────────────────────────────────────────┐
│  DECRYPT, USING A DECRYPTION MODULE, THE HOST DATA AND │
│                      METADATA                       │
│                         205                         │
└─────────────────────────────────────────────────────┘
```

FIG. 2

SYSTEM FOR MONITORING NETWORKED COMPUTING DEVICES WITH INTEGRATED ELECTRONIC DATA ENCRYPTION AND DECRYPTION MECHANISM

FIELD OF THE INVENTION

The present disclosure embraces a system for monitoring networked computing devices with integrated electronic data encryption and decryption mechanism.

BACKGROUND

There is a need for a secure and scalable way to monitor computing devices over a network.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system for monitoring networked computing devices with integrated electronic data encryption and decryption mechanism is provided. In particular, the system may comprise one or more host applications which may interact with an API layer to transmit encrypted host-related data through a secure data rails to a consolidated data repository. One or more downstream monitoring applications may retrieve and decrypt the host-related data from the consolidated data repository for analysis. In this way, the system may provide a secure, scalable way to monitor host computing systems and flow of sensitive electronic data.

Accordingly, embodiments of the present disclosure provide a system for a system for monitoring networked computing devices with integrated electronic data encryption and decryption mechanism. The system may comprise a memory device with computer-readable program code stored thereon; a communication device; and a processing device operatively coupled to the memory device and the communication device. The processing device may be configured to execute the computer-readable program code to receive, from a host computing system via an application programming interface ("API") layer, host data and metadata; encrypt, using an encryption module, the host data and metadata; transmit the host data and metadata to a consolidated data sink; receive a request from a monitoring computing system to decrypt the host data and metadata; and decrypt, using a decryption module, the host data and metadata.

In some embodiments, decrypting the host data and metadata comprises generating a decrypted copy of the host data and metadata using a symmetric cryptographic key; and presenting the decrypted copy of the host data on a graphical interface of a display of the monitoring computing system.

In some embodiments, the computer-readable program code further causes the processing device to detect that the monitoring computing system has stopped viewing the decrypted copy of the host data; and automatically delete the decrypted copy of the host data.

In some embodiments, the decrypted copy of the host data is stored on a web server, wherein the graphical interface of the display of the monitoring computing system comprises a web browser.

In some embodiments, the consolidated data sink is a relational database comprising a table, the table containing entries for an identity of a user associated with the host computing system, types of data processed by the host computing system, and processes executed by the host computing system.

In some embodiments, decrypting the host data and metadata comprises performing a batch decryption of encrypted data within the consolidated data sink.

In some embodiments, the first sequence of network packets comprises Transmission Control Protocol ("TCP") synchronize ("SYN") packets.

In some embodiments, receiving the host data and metadata comprises establishing a Hypertext Transfer Protocol Secure ("HTTPS") connection with the host computing system.

Embodiments of the present disclosure also provide a computer program product for monitoring networked computing devices with integrated electronic data encryption and decryption mechanism. The computer program product may comprise at least one non-transitory computer readable medium having computer-readable program code portions embodied therein, the computer-readable program code portions comprising executable code portions for receiving, from a host computing system via an application programming interface ("API") layer, host data and metadata; encrypting, using an encryption module, the host data and metadata; transmitting the host data and metadata to a consolidated data sink; receiving a request from a monitoring computing system to decrypt the host data and metadata; and decrypting, using a decryption module, the host data and metadata.

In some embodiments, decrypting the host data and metadata comprises generating a decrypted copy of the host data and metadata using a symmetric cryptographic key; and presenting the decrypted copy of the host data on a graphical interface of a display of the monitoring computing system.

In some embodiments, the computer-readable program code portions further comprise executable code portions for detecting that the monitoring computing system has stopped viewing the decrypted copy of the host data; and automatically deleting the decrypted copy of the host data.

In some embodiments, the decrypted copy of the host data is stored on a web server, wherein the graphical interface of the display of the monitoring computing system comprises a web browser.

In some embodiments, the consolidated data sink is a relational database comprising a table, the table containing entries for an identity of a user associated with the host computing system, types of data processed by the host computing system, and processes executed by the host computing system.

In some embodiments, decrypting the host data and metadata comprises performing a batch decryption of encrypted data within the consolidated data sink.

Embodiments of the present disclosure also provide a computer-implemented method for monitoring networked computing devices with integrated electronic data encryption and decryption mechanism, wherein the computer-implemented method comprises receiving, from a host computing system via an application programming interface ("API") layer, host data and metadata; encrypting, using an encryption module, the host data and metadata; transmitting the host data and metadata to a consolidated data sink; receiving a request from a monitoring computing system to decrypt the host data and metadata; and decrypting, using a decryption module, the host data and metadata.

In some embodiments, decrypting the host data and metadata comprises generating a decrypted copy of the host data and metadata using a symmetric cryptographic key; and presenting the decrypted copy of the host data on a graphical interface of a display of the monitoring computing system.

In some embodiments, the method further comprises detecting that the monitoring computing system has stopped viewing the decrypted copy of the host data; and automatically deleting the decrypted copy of the host data.

In some embodiments, the decrypted copy of the host data is stored on a web server, wherein the graphical interface of the display of the monitoring computing system comprises a web browser.

In some embodiments, the consolidated data sink is a relational database comprising a table, the table containing entries for an identity of a user associated with the host computing system, types of data processed by the host computing system, and processes executed by the host computing system.

In some embodiments, decrypting the host data and metadata comprises performing a batch decryption of encrypted data within the consolidated data sink.

In some embodiments, receiving the host data and metadata comprises establishing a Hypertext Transfer Protocol Secure ("HTTPS") connection with the host computing system.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
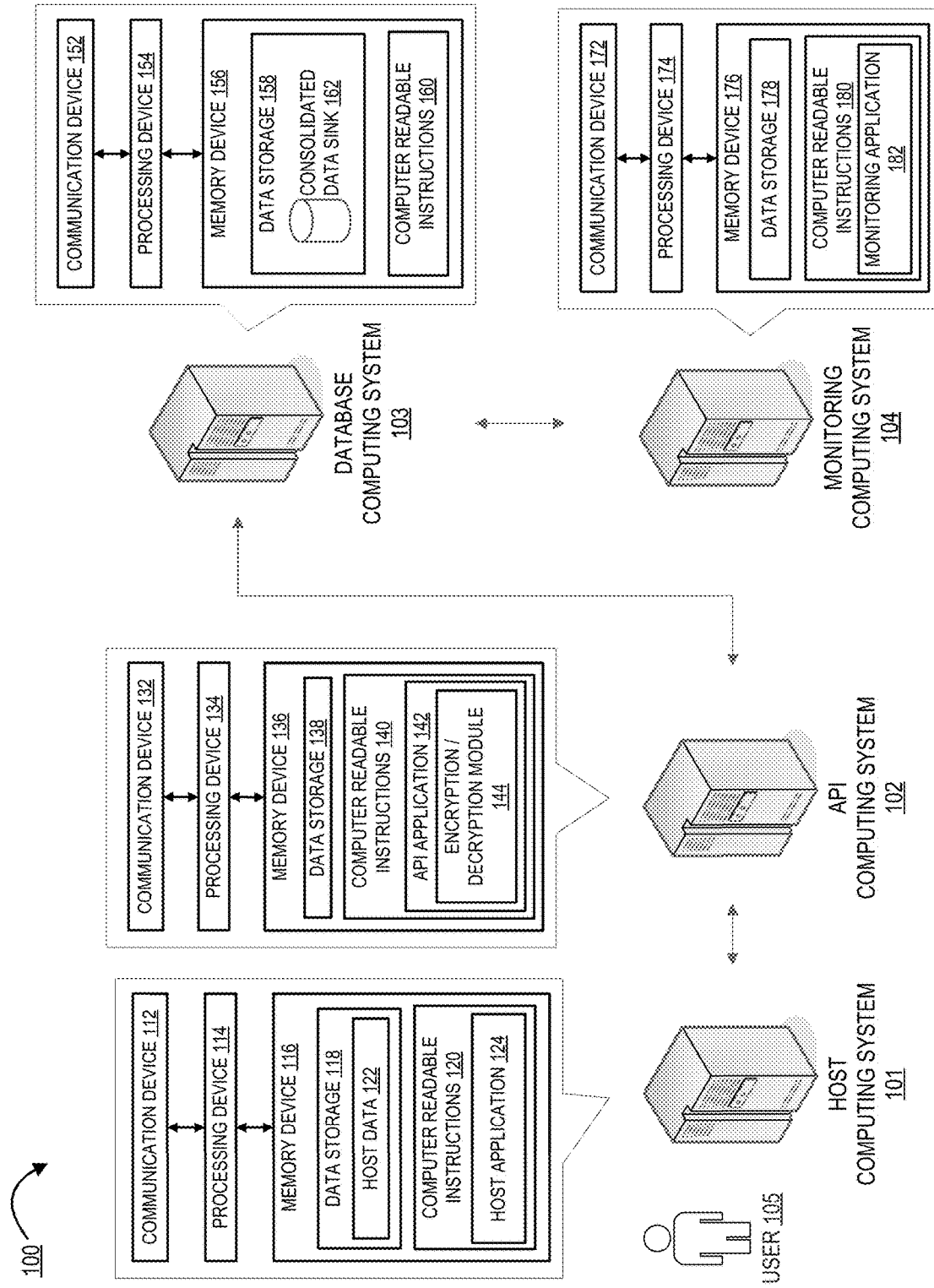

Having thus described embodiments of the invention in general terms, reference will now be made to the accompanying drawings, wherein:

FIG. 1 illustrates an operating environment for the computing device monitoring system, in accordance with one embodiment of the present disclosure; and FIG. 2 illustrates a process flow for monitoring computing devices with integrated encryption and decryption, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Resource" as used herein may refer to physical and virtual objects and/or processes used to accomplish the entity's objectives. In this regard, "resource" may refer to applications, data files, computing systems and/or hardware, computing resources (e.g., processing power, memory space, or the like), computing functions, or the like.

"Encryption" as used herein may refer to a set of logical and/or mathematical operations or processes that may be executed on a specified segment of data to produce a cryptographic/encrypted output. Accordingly, "decryption" as used herein may refer to a process by which encrypted data is reconverted to an unencrypted state. In some embodiments, the data may be encrypted using a hash algorithm which produces a fixed-length character string output. Examples of such hash algorithms may include MD5, Secure Hash Algorithm/SHA, or the like. According, "hashing" or "hashed" as used herein may refer to the process of producing a hash output based on a data input into a hash algorithm.

"Key" or "cryptographic key" as used herein may refer to data (e.g., a character string) which determines the manner in which an input is transformed into an output using a cryptographic algorithm (e.g., an encryption algorithm). Accordingly, "symmetric cryptography" or "symmetric key cryptography" may refer to a process for data encryption by which multiple users and/or devices use the same key to encrypt communications.

"Public-key cryptography" or "asymmetric cryptography" may refer to a process for data encryption and/or verification by which a pair of asymmetric corresponding cryptographic keys are generated (e.g., a "key pair" comprising a "public key" intended to be distributed and a "private key" intended to be possessed by a single user or device). Data encrypted using a public key may be decrypted only by the possessor of the corresponding private key. Furthermore, data signed with a private key may be validated by the possessor of the corresponding public key to verify the identity of the signer (which may be referred to herein as "digital signing").

An entity's computing network may store and/or process various types of sensitive data. For example, the sensitive data may include confidential information such as nonpublic personal information ("NPI" or "NPPI") associated with one or more users. In this regard, the entity may wish to reliably monitor and track the storage, flow, and usage of such data by hundreds or thousands of applications in the network environment to ensure the data is processed only by authorized applications and/or users.

Accordingly, the system may comprise one or more applications which may store or process potentially sensitive data (referred to herein as "host applications"). Each host application may be communicatively coupled (e.g., by HTTPS, FTP, or the like) to an application programming interface ("API") layer. In this regard, each host application may transmit data and/or metadata related to the host application (referred to herein as "host data"), such as the computing device or user associated with the host application, the types of data processed by the host application, specific actions taken by the host application with respect to the data (e.g., store, copy, or move operations, or the like). By using the API layer, the system may ensure that numerous disparate host applications, each of which may not be configured to communicate directly with one another or any downstream applications, can provide host data to the downstream applications through the API intermediary.

In some embodiments, the API layer may comprise an encryption/decryption module which may be called to encrypt and/or decrypt the host data. In some embodiments, the encryption/decryption module may be configured to encrypt incoming host data "in-flight" without a need for the host application to manually call the module to encrypt the host data. The encryption/decryption module may further be configured, in some embodiments, to automatically decrypt the encrypted host data when the host data is pulled by downstream monitoring applications. The encryption/decryption module may use symmetric and/or asymmetric key cryptography to encrypt and decrypt the host data. Examples of encryption algorithms that may be used by the encryption/decryption module may include Advanced Encryption Standard ("AES"), Rivest Cipher 4, 5, or 6 ("RC4," "RC5," or "RC6"), Data Encryption Standard ("DES"), or the like.

The system may further comprise a consolidated data sink or repository wherein the host data and/or metadata are stored. The consolidated data sink may be, for instance, a Structured Query Language ("SQL") database which may store the host data in table format. The tables may contain entries for data and/or metadata within the host data. For instance, the tables may include entries for information such as the user associated with the host computing, the types of data stored and/or processed (e.g., NPI, PII, or the like), the applications used to store and/or process the data, the actions executed on the data (e.g., copied, modified, downloaded/uploaded, or the like), or the like. Accordingly, the consolidated data sink may comprise a complete record of what users and/or applications have accessed potentially sensitive data and what processes were carried out on such data.

Once the host data has been stored in the consolidated data sink, one or more monitoring applications may pull the host data and/or metadata from the consolidated data sink for analysis. In this regard, the monitoring application may make a decryption call to the encryption/decryption mechanism within the API layer to decrypt the encrypted host data. Once the host data has been decrypted, the monitoring application may be used to view the host data and/or perform subsequent analysis of the host data. In this way, the system may provide a secure way to ensure that sensitive data is used for authorized purposes.

In some embodiments, the system may comprise a web-based portal through which host data may be pulled from the host computing systems. In this regard, the monitoring application may comprise a web browser application which may be displayed on a graphical interface of the monitoring application and operated by a user associated with the monitoring application to request a data pull from the various host computing systems. The host data may then be pulled on an on-demand basis through the API layer into the consolidated data sink and/or monitoring application for viewing within the web browser. In other embodiments, the host data may be pulled and/or decrypted at predetermined intervals as part of an automated batch processing model.

An exemplary embodiment is provided for illustrative purposes. In one embodiment, a host application (e.g., a file explorer application) may execute a copy operation of data containing NPI (e.g., a customer's information) from a server to an internal hard drive. The host application may then transmit host data (e.g., data and/or metadata regarding the data processed and/or stored, the operations conducted, the user who executed the operation, the date/time of the operations, and the like) to the API layer (e.g., by an HTTPS connection). The encryption/decryption mechanism may encrypt the host data/metadata and transmit the encrypted host data/metadata to a consolidated data sink. A monitoring application may then pull and decrypt the host data/metadata from the consolidated data sink such that the host data/metadata is displayed on a graphical interface within the monitoring application. In this way, the monitoring application may be used to determine whether the operations conducted by the host application on the NPI data was an authorized operation.

The system as described herein confers a number of technological advantages over conventional application monitoring systems. In particular, by using an API layer, the system may be scaled to support thousands of applications without the need to manually configure each application to provide host data to the monitoring applications. Furthermore, the integrated encryption/decryption mechanism within the API layer allows host data to be encrypted in-flight without the need for each individual host application itself to perform the encryption and/or decryption processes.

Turning now to the figures, FIG. 1 illustrates an operating environment 100 for the application monitoring system, in accordance with one embodiment of the present disclosure. In particular, FIG. 1 illustrates a host computing system 101 that is operatively coupled, via a network, to an API computing system 102, a database computing system 103, and a monitoring computing system 104. In such a configuration, the host computing system 101 may transmit information to and/or receive information from the API computing system 102, a database computing system 103, and a monitoring computing system 104. It should be understood that FIG. 1 illustrates only an exemplary embodiment of the operating environment 100, and it will be appreciated that one or more functions of the systems, devices, or servers as depicted in FIG. 1 may be combined into a single system, device, or server. For instance, while the database computing system 103 and the monitoring computing system 104 are depicted in FIG. 1 as separate computing systems, the functions of both computing systems may, in some embodiments, be executed on a single computing system. Furthermore, a single system, device, or server as depicted in FIG. 1 may represent multiple systems, devices, or servers. For instance, though the host computing system 101 is depicted as a single unit, the operating environment 100 may comprise multiple host computing systems in operative communication with the API computing system 102.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the host computing system 101 may be a networked server, desktop computer, laptop computer, IoT device, smartphone, tablet, single-board computer, or other type of computing system within the network environment which may store and/or process various types of data (e.g., sensitive data such as NPI) within the operating environment 100. For instance, the host computing system 101 may be a receiving computing device. In other embodiments, the cryptographic key exchange system 101 may designate packet/port sequences to be used in the key exchange process.

Accordingly, the host computing system 101 may comprise a processing device 114 operatively coupled to a communication device 112 and a memory device 116 having data storage 118 and computer readable instructions 120 stored thereon. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 is operatively coupled to the communication device 112 and the memory device 116. The processing device 114 uses the communication device 112 to communicate with the network and other devices on the network, such as, but not limited to the API computing system 102. The communication device 112 generally comprises a modem, antennae, WiFi or Ethernet adapter, radio transceiver, or other device for communicating with other devices on the network.

The memory device 116 may include data storage 118 for storing data related to the system environment. The memory device 116 may further have computer-readable instructions 120 stored thereon, which in one embodiment includes the computer-readable instructions 120 of a host application 124, which may comprise computer-executable program code which may instruct the processing device 114 to perform certain logic, data processing, and data storing functions of the application to accomplish the entity's objectives. For instance, the host application 124 may be configured to gather host data and/or metadata (e.g., data and/or metadata relating to storage and/or processing of potentially sensitive data by the host computing system 101) and transmit such data and/or metadata to the API computing system 102.

In some embodiments, the host computing system 101 may be operated by a user 105. In such embodiments, the host computing system 101 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

As further illustrated in FIG. 1, the operating environment 100 may further comprise an API computing system 102 in operative communication with the host computing system 101. The API computing system 102 may be a server, networked terminal, or other "headless" type of computing system, though it is within the scope of the disclosure for the API computing system 102 to be any other kind of computing system as described herein. Accordingly, the API computing system 102 may comprise a processing device 134 operatively coupled to a communication device 132 and a memory device 136 having data storage 138 and computer readable instructions 140 stored thereon, where the computer readable instructions 140 may include an API application 142. The API application 142 may perform the host data collection and encryption/decryption thereof as described elsewhere herein. In this regard, the API application 142 may comprise an encryption/decryption module 144 which may provide automatic encryption and decryption of host data.

As further illustrated in FIG. 1, the operating environment 100 may further comprise a database computing system 103. The database computing system 103 may comprise a processing device 154 communicatively coupled to a communication device 152 and a memory device 156 having data storage 158 and computer readable instructions 160 stored thereon. The data storage 158 may comprise a consolidated data sink 162 which may be a repository of host data from the host computing system 101 provided to the database computing system 103 by the API computing system 102. In this regard, the consolidated data sink 162 may be a relational (e.g., SQL) database which may store encrypted host data in a relational format (e.g., tables).

As further illustrated in FIG. 1, the operating environment 100 may further comprise a monitoring computing system 104 comprising a processing device 174 communicatively coupled to a communication device 174 and a memory device 176 having data storage 178 and computer readable instructions 180 stored thereon. The computer readable instructions 180 may comprise a monitoring application 182 which may perform the monitoring and data analysis functions of the host data as described elsewhere herein. In this regard, the monitoring application 182 may access the host data within consolidated data sink 162 of the database computing system 103 and/or make decryption calls to the API application 142 of the API computing system 102.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for monitoring computing devices with integrated encryption and decryption, in accordance with some embodiments. The process begins at block 201, where the system receives, from a host computing system via an application programming interface ("API") layer, a set of host data and metadata. The system may receive host data from multiple different types of disparate applications through multiple different channels via the API layer. The host data (and metadata) may comprise data regarding the storage and/or processing of potentially sensitive data by one or more host applications running on the host computing system. In an exemplary embodiment, an entity may wish to assess whether a host application (and associated user) processed sensitive data (e.g., a customer's NPI) in an authorized manner. In such an embodiment, the host data and metadata may comprise information such as the identity of the user associated with the host computing system, types of sensitive data processed, the operations taken on the data (e.g., copy, store, move, modify, delete, or the like), data access timeframes, and the like. The host computing system may transmit the host data and metadata to the API layer through a secure connection such as a Hypertext Transfer Protocol Secure ("HTTPS") connection.

The process continues to block 202, where the system encrypts, using an encryption module, the host data and metadata. In this regard, the system may be configured to use an encryption and/or decryption module to automatically encrypt host data and metadata received from host computing systems. In this way, the system may ensure that potentially sensitive data and/or metadata are accessed only by authorized users and/or applications (e.g., authorized monitoring applications). Accordingly, the host data and metadata may be encrypted using an encryption algorithm such as DES, RSA, AES, or the like.

The process continues to block 203, where the system transmits the host data and metadata to a consolidated data sink. The consolidated data sink may be a data repository for host data and metadata. In this way, the system may provide monitoring applications with a secure, centralized location for data auditing purposes. Accordingly, in some embodiments, the consolidated data sink may be a relational database which stores host data and metadata relating to numerous different users, applications, and computing systems which may process sensitive data within the entity's network environment.

The process continues to block 204, where the system receives a request from a monitoring computing system to decrypt the host data and metadata. Once the consolidated data sink has been populated with encrypted host data (and metadata), the host data must be decrypted before a monitoring application may be used to audit the host data. In this regard, the monitoring application may make a decryption call to the API layer to decrypt a requested set of host data. In some embodiments, a user associated with the monitoring application (e.g., an administrator who has been tasked with auditing the host data) may manually select the host data to be decrypted. In other embodiments, the system may be configured to automatically perform batch decryption of sets of host data for a given time period. For example, the system may be configured to perform batch decryption of host data from 10 applications per 24 hours. In this way, the system may ensure that host data is decrypted only for the purposes of performing the monitoring as described herein.

The process continues to block 205, where the system decrypts, using a decryption module, the host data and metadata. In embodiments in which the system has encrypted the host data using a symmetric encryption algorithm, the system may decrypt the encrypted host data using a symmetric cryptographic key. Once the data has been decrypted, the decrypted copy of the host data and metadata may be presented on a graphical interface on a display of the monitoring computing system. In some embodiments, the decrypted host data may be stored (temporarily, in some embodiments) on a web server such that the decrypted host data may be accessed via a web browser on the monitoring computing system.

In some embodiments, the system may be configured to automatically delete the decrypted host data and/or re-encrypt the decrypted host data once the monitoring application has completed its review processes. For instance, the system may detect that the user of the monitoring computing system has closed the browser (e.g., has stopped viewing the decrypted host data). The system may then automatically wipe the decrypted host data from the web server. In some embodiments, the system may also automatically delete the encrypted host data from the consolidated data sink once the host data has been decrypted and reviewed by the monitoring application. In this way, the system may provide a scalable and secure solution for monitoring host data across multiple different applications and channels.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for monitoring networked computing devices with integrated electronic data encryption and decryption mechanism, the system comprising:
   a memory device with computer-readable program code stored thereon;
   a communication device; and
   a processing device operatively coupled to the memory device and the communication device, wherein the processing device is configured to execute the computer-readable program code to:

receive, from a host computing system via an application programming interface ("API") layer, host data and metadata;

encrypt, using an encryption module, the host data and metadata;

transmit the host data and metadata to a consolidated data sink;

receive a request from a monitoring computing system to decrypt the host data and metadata;

decrypt, using a decryption module, the host data and metadata, wherein decrypting the host data and metadata comprises:

generating a decrypted copy of the host data and metadata using a symmetric cryptographic key; and presenting the decrypted copy of the host data on a graphical interface of a display of the monitoring computing system;

detect that the monitoring computing system has stopped viewing the decrypted copy of the host data; and automatically delete the decrypted copy of the host data.

2. The system according to claim 1, wherein the decrypted copy of the host data is stored on a web server, wherein the graphical interface of the display of the monitoring computing system comprises a web browser.

3. The system according to claim 1, wherein the consolidated data sink is a relational database comprising a table, the table comprising entries for an identity of a user associated with the host computing system, types of data processed by the host computing system, and processes executed by the host computing system.

4. The system according to claim 1, wherein decrypting the host data and metadata comprises performing a batch decryption of encrypted data within the consolidated data sink.

5. The system according to claim 1, wherein receiving the host data and metadata comprises establishing a Hypertext Transfer Protocol Secure ("HTTPS") connection with the host computing system.

6. A computer program product for monitoring networked computing devices with integrated electronic data encryption and decryption mechanism, the computer program product comprising at least one non-transitory computer readable medium having computer-readable program code portions embodied therein, the computer-readable program code portions comprising executable code portions for:

receiving, from a host computing system via an application programming interface ("API") layer, host data and metadata;

encrypting, using an encryption module, the host data and metadata;

transmitting the host data and metadata to a consolidated data sink;

receiving a request from a monitoring computing system to decrypt the host data and metadata;

decrypting, using a decryption module, the host data and metadata, wherein decrypting the host data and metadata comprises:

generating a decrypted copy of the host data and metadata using a symmetric cryptographic key; and presenting the decrypted copy of the host data on a graphical interface of a display of the monitoring computing system;

detecting that the monitoring computing system has stopped viewing the decrypted copy of the host data; and automatically deleting the decrypted copy of the host data.

7. The computer program product according to claim 6, wherein the decrypted copy of the host data is stored on a web server, wherein the graphical interface of the display of the monitoring computing system comprises a web browser.

8. The computer program product according to claim 6, wherein the consolidated data sink is a relational database comprising a table, the table comprising entries for an identity of a user associated with the host computing system, types of data processed by the host computing system, and processes executed by the host computing system.

9. The computer program product according to claim 6, wherein decrypting the host data and metadata comprises performing a batch decryption of encrypted data within the consolidated data sink.

10. A computer-implemented method for monitoring networked computing devices with integrated electronic data encryption and decryption mechanism, wherein the computer-implemented method comprises:

receiving, from a host computing system via an application programming interface ("API") layer, host data and metadata;

encrypting, using an encryption module, the host data and metadata;

transmitting the host data and metadata to a consolidated data sink;

receiving a request from a monitoring computing system to decrypt the host data and metadata;

decrypting, using a decryption module, the host data and metadata, wherein decrypting the host data and metadata comprises:

generating a decrypted copy of the host data and metadata using a symmetric cryptographic key; and presenting the decrypted copy of the host data on a graphical interface of a display of the monitoring computing system;

detecting that the monitoring computing system has stopped viewing the decrypted copy of the host data; and automatically deleting the decrypted copy of the host data.

11. The computer-implemented method according to claim 10, wherein the decrypted copy of the host data is stored on a web server, wherein the graphical interface of the display of the monitoring computing system comprises a web browser.

12. The computer-implemented method according to claim 10, wherein the consolidated data sink is a relational database comprising a table, the table comprising entries for an identity of a user associated with the host computing system, types of data processed by the host computing system, and processes executed by the host computing system.

13. The computer-implemented method according to claim 10, wherein decrypting the host data and metadata comprises performing a batch decryption of encrypted data within the consolidated data sink.

14. The computer-implemented method according to claim 10, wherein receiving the host data and metadata comprises establishing a Hypertext Transfer Protocol Secure ("HTTPS") connection with the host computing system.

* * * * *